(12) United States Patent
Cho et al.

(10) Patent No.: US 11,299,032 B2
(45) Date of Patent: Apr. 12, 2022

(54) COOLING APPARATUS AND A COOLING SYSTEM PROVIDED WITH THE SAME FOR AUTONOMOUS DRIVING CONTROLLER

(71) Applicants: Hyundai Motor Company, Seoul (KR); Kia Motors Corporation, Seoul (KR)

(72) Inventors: Wan Je Cho, Hwaseong-si (KR); Namho Park, Suwon-si (KR); Jeawan Kim, Gwangmyeong-si (KR); Yeonho Kim, Seoul (KR); Tae Hee Kim, Hwaseong-si (KR); Jae-Eun Jeong, Hwaseong-si (KR); Jae Yeon Kim, Hwaseong-si (KR); Seong-Bin Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/094,535

(22) Filed: Nov. 10, 2020

(65) Prior Publication Data
US 2021/0347246 A1   Nov. 11, 2021

(30) Foreign Application Priority Data
May 8, 2020   (KR) .................. 10-2020-0054943

(51) Int. Cl.
*B60K 11/02* (2006.01)
*F01P 3/20* (2006.01)
*B60H 1/00* (2006.01)
*F01P 5/10* (2006.01)

(52) U.S. Cl.
CPC .......... *B60K 11/02* (2013.01); *B60H 1/00271* (2013.01); *F01P 3/20* (2013.01); *F01P 5/10* (2013.01); *F01P 2050/22* (2013.01); *F01P 2050/30* (2013.01)

(58) Field of Classification Search
CPC ..... B60K 11/02; F01P 3/20; F01P 5/10; F01P 2050/22; F01P 2050/30; B60H 1/00271; B60L 58/26
See application file for complete search history.

(56) References Cited

U.S. PATENT DOCUMENTS

2019/0168569 A1*   6/2019   Lee .................... B60H 1/00

* cited by examiner

*Primary Examiner* — Jacob M Amick
(74) *Attorney, Agent, or Firm* — Morgan, Lewis & Bockius LLP

(57) ABSTRACT

A cooling apparatus for an autonomous driving controller may include, a chiller fluidically connected to an air-conditioning system through a refrigerant connection line so that a refrigerant circulating in the air-conditioning system provided in the vehicle is introduced into the chiller; a reservoir tank storing a coolant, and fluidically connected to the chiller; and a water pump mounted between the reservoir tank and the autonomous driving controller; wherein coolant pipes connected to the water pump and the chiller may be connected to the autonomous driving controller respectively.

14 Claims, 4 Drawing Sheets

COOLING APPARATUS AND A COOLING SYSTEM PROVIDED WITH THE SAME FOR AUTONOMOUS DRIVING CONTROLLER

CROSS-REFERENCE TO RELATED APPLICATION

The present application claims priority to Korean Patent Application No. 10-2020-0054943 filed on May 8, 2020, the entire contents of which is incorporated herein for all purposes by this reference.

BACKGROUND OF THE INVENTION

Field of the Invention

The present invention relates to a cooling apparatus and a cooling system provided with the same for an autonomous driving controller. More particularly, the present invention relates to a cooling apparatus and a cooling system provided with the same for an autonomous driving controller for efficiently controlling an autonomous driving controller in communication with an air-conditioning system in an autonomous vehicle.

Description of Related Art

In general, an air-conditioning system to control an indoor temperature of a vehicle is provided in the vehicle.

The air-conditioning system maintains an internal temperature of the vehicle at an appropriate temperature regardless of a change in an outside temperature and maintains a pleasant internal environment, and is configured to heat or cool the internal place of the vehicle by heat exchange by an evaporator in a process in which a refrigerant discharged by driving a compressor passes through the condenser, a receiver drier, an expansion valve, and an evaporator and is then circulated to the compressor again.

That is, in a cooling mode in summer, in the air conditioning system, a high-temperature and high-pressure gas phase refrigerant compressed by the compressor is condensed through the condenser and then is evaporated in the evaporator through the receiver drier and the expansion valve to decrease an internal temperature and humidity.

On the other hand, development of an autonomous vehicle has recently been required, and a radar, a Light Detection and Ranging (LiDAR), a GPS, etc. required for autonomous driving, various sensors, and a control device controlling them are mounted in a trunk of the vehicle.

However, in the above-described autonomous vehicle, as a separate cooling system for cooling the control device of which a calorific value is relatively large is required along with the air-conditioning system for cooling or heating the interior of the vehicle, there are drawbacks that a cost increases and it is difficult to secure a space for mounting the cooling system inside the narrow vehicle.

Also, a size and a weight of a cooling module mounted in front of the vehicle are increased, and there is a problem that a layout of connection pipes supplying a refrigerant or a coolant to the air-conditioning system, the cooling system of the control device, and a battery cooling system is complicated inside the engine compartment.

And when the cooling system for the autonomous driving controller is coupled in series with the cooling system for the battery module, even if only one of the autonomous driving controller and the battery module needs cooling, as the autonomous driving controller and the battery module are simultaneously cooled, there are drawbacks in which the cooling of the autonomous driving controller or the battery module that requires cooling is not performed properly.

Furthermore, guaranteed temperatures of the coolant for cooling each cooling system are different from each other, but when cooling each cooling system coupled in series simultaneously, there is an adverse drawback in terms of power consumption because the cooling may be performed based on a system with a low guaranteed temperature.

When the cooling performance of the cooling system for the autonomous driving controller deteriorates, the autonomous driving controller may not be properly cooled, causing malfunctions or errors of operation performance, and also having a risk which is directly related to the safety of drivers and pedestrians.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a cooling apparatus and a cooling system provided with the same for an autonomous driving controller that heat-exchanges coolants in conjunction with an air-conditioning system in a vehicle configured for autonomous driving and efficiently cools an autonomous driving controller by use of heat-exchanged low temperature coolant.

A cooling apparatus of an autonomous driving controller includes, a chiller fluidically connected to an air-conditioning system through a refrigerant connection line so that a refrigerant circulating in the air-conditioning system provided in the vehicle is introduced into the chiller; a reservoir tank storing a coolant, and fluidically connected to the chiller; and a water pump mounted between the reservoir tank and the autonomous driving controller; wherein coolant pipes connected to the water pump and the chiller may be connected to the autonomous driving controller respectively.

A sub-expansion valve may be mounted on the chiller to expand the refrigerant supplied to the refrigerant connection line.

The sub-expansion valve may be connected to the refrigerant connection line, and is integrally mounted on the chiller.

The sub-expansion valve may expand the refrigerant and supply it to the chiller.

The chiller, the reservoir tank, the water pump, and the autonomous driving controller may be interconnected through a coolant pipe so that the coolant stored in the reservoir tank circulates therebetween.

The coolant stored the reservoir tank may be passed through the chiller by operation of the water pump, and the coolant passed through the chiller may be supplied to the autonomous driving controller.

The chiller and the water pump may be directly mounted on the reservoir tank.

A stop connector may be mounted on the coolant pipe connected to the water pump and the chiller respectively.

A connection pipe may be provided in the autonomous driving controller to connect the stop connector.

The chiller, the reservoir tank, and the water pump have a modular structure in which the chiller and the water pump are integrally connected through the reservoir tank may be formed.

A cooling system for an autonomous driving controller includes, an air-conditioning system including a compressor, a condenser, an expansion valve, and an evaporator connected to a refrigerant line to heat or cool an interior of a vehicle using thermal energy generated when a refrigerant in the refrigerant line is condensed and evaporated; a chiller connected to the air-conditioning system through a refrigerant connection line so that the refrigerant circulates in the air-conditioning system; a reservoir tank storing a coolant, and fluidically connected to the chiller; a water pump mounted between the reservoir tank and the chiller; wherein an autonomous driving controller is provided between the water pump and the chiller, and wherein the chiller may selectively supply the coolant to the autonomous driving controller while cooling the coolant supplied from the reservoir tank through heat exchange with the refrigerant to prevent the autonomous driving controller from overheating.

The chiller, the reservoir tank, the water pump, and the autonomous driving controller may be interconnected through a coolant pipe so that the coolant stored in the reservoir tank circulates therebetween.

A sub-expansion valve may be provided between chiller and the refrigerant connection line to expand the refrigerant supplied through the refrigerant line.

The sub-expansion valve may expand the refrigerant and supply it to the chiller.

The chiller may be a water-cooled heat exchanger.

As above-described, according to the cooling apparatus and the cooling system provided with the same for an autonomous driving controller according to the exemplary embodiments of the present invention, it may heat-exchange the refrigerant and the coolant in cooperation with the air-conditioning system in the vehicle configured for autonomous driving and efficiently cool the autonomous driving controller by use of the coolant of the heat-exchanged low temperature, simplifying the entire system and the layout of the coolant pipe.

Furthermore, by facilitating installation and detachment through modularization of the cooling apparatus, manufacturing cost may be reduced and weight may be reduced, and space utilization and maintenance may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
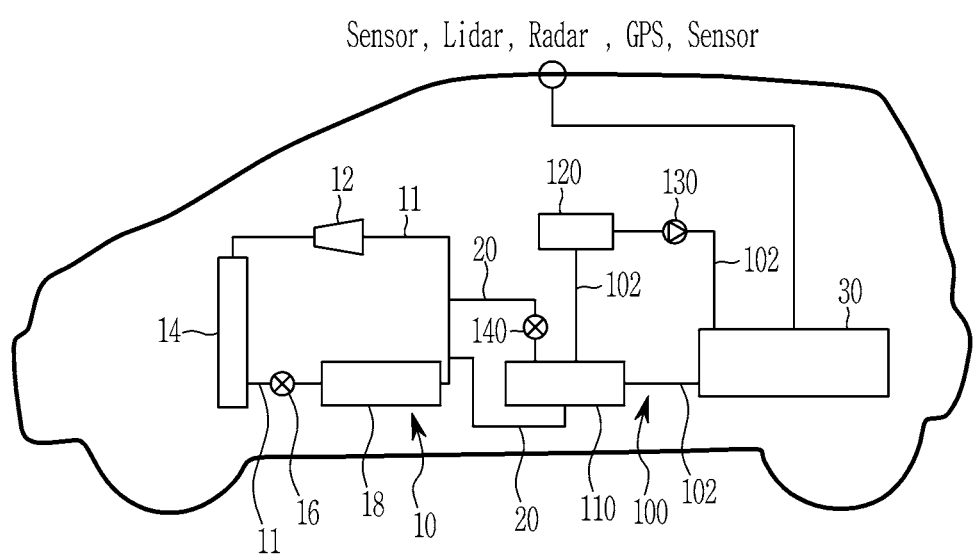
FIG. 1 is a schematic view of a cooling system for an autonomous driving controller according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Exemplary embodiments described in the exemplary embodiment and configurations shown in the drawings are just the most preferable exemplary embodiments of the present invention, but do not limit the spirit and scope of the present invention. Therefore, it should be understood that there may be various equivalents and modifications capable of replacing them at the time of filing of the present application.

To clarify the present invention, portions that are not connected with the description will be omitted, and the same elements or equivalents are referred to by the same reference numerals throughout the specification.

The size and thickness of each element are arbitrarily shown in the drawings, and the present invention is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Furthermore, the terms " . . . unit", " . . . mechanism", " . . . portion", " . . . member", etc. used herein mean a unit of inclusive components performing one or more functions or operations.

FIG. 1 is a schematic view of a cooling system for an autonomous driving controller according to various exemplary embodiments of the present invention.

Referring to FIG. 1, a cooling system for an autonomous driving controller according to various exemplary embodiments of the present invention is applied to an autonomous vehicle.

The vehicle is basically mounted with an air-conditioning system 10 for cooling or heating the vehicle interior.

Here, the air-conditioning system 10 may include a compressor 12, a condenser 14, an expansion valve 16, and an evaporator 18, which are connected by a refrigerant line 11, to cool or heat the vehicle's internal by use of thermal energy generated when the refrigerant changes phase.

The compressor 12 compresses the refrigerant, and the condenser 14 condenses the refrigerant compressed in the compressor 12.

The expansion valve 16 expands the refrigerant condensed in the condenser 14, and the evaporator 18 evaporates the expanded refrigerant.

The evaporator 18 is provided inside heating, ventilation, and air conditioning (HVAC) module provided in the vehicle.

The vehicle including the air-conditioning system 10 configured as described above is provided with a radar, a Light Detection and Ranging (LIDAR), a Global Positioning System (GPS), and various sensors for the autonomous driving, and an autonomous driving controller 30 for controlling these pieces of equipment is provided.

Here, the cooling system for the autonomous driving controller according to various exemplary embodiments of the present invention includes a cooling apparatus 100 including the chiller 110, the reservoir tank 120, the water pump 130.

First, the chiller 110 is connected to the air-conditioning system 10 through a refrigerant connection line 20 to inflowed the refrigerant circulating in the air-conditioning system 10.

The chiller 110 heat-exchanges the inflowed refrigerant with the coolant supplied from the reservoir tank 120. That is, the chiller 110 may be a water-cooled heat exchanger.

The reservoir tank 120 stores the coolant and is connected to the chiller 110 through a coolant pipe 102.

The water pump 130 is provided on the coolant pipe 102 between the reservoir tank 120 and the chiller 110.

The autonomous driving controller 30 may be provided on the coolant pipe 102 between the water pump 130 and the chiller 110.

That is, the coolant pipe 102 connected to the water pump 130 and the chiller 110 may be connected to the autonomous driving controller 30 respectively.

The autonomous driving controller 30 configured as described above includes a water cooling type which is cooled by the coolant inflowed therein.

Accordingly, the chiller 110, the reservoir tank 120, the water pump 130, and the autonomous driving controller 30 may be interconnected through the coolant pipe 102 so that the coolant stored in the reservoir tank 120 circulates.

On the other hand, in the exemplary embodiment of the present invention, a sub-expansion valve 140 may be provided between chiller 110 and the refrigerant connection line 20 to expand the refrigerant supplied to the chiller 110 through the refrigerant line 11.

The sub-expansion valve 140 may expand the refrigerant supplied from the refrigerant line 11 through the refrigerant connection line 20 and supply the refrigerant to the chiller 110. The sub-expansion valve 140 may be configured mechanically or electronically.

In the cooling system for the autonomous driving controller configured as described above, the chiller 110 may selectively supply the coolant to the autonomous driving controller 30 while cooling the coolant supplied from the reservoir tank 130 through heat exchange with the refrigerant to prevent the autonomous driving controller 30 from overheating.

That is, the chiller 110 heat-exchanges the refrigerant supplied with the expanded state from the sub-expansion valve 140 with the coolant supplied from the reservoir tank 120 by the operation of the water pump 130.

The coolant of a low temperature which is cooled through heat exchange with the refrigerant in the chiller 110 may be supplied to the autonomous driving controller 30 by the operation of the water pump 130 to cool the autonomous driving controller 30.

That is, the coolant circulating along the coolant pipe 102 through operation of the water pump 130 is supplied to the autonomous driving controller 30 in the cooled state while passing through the chiller 110, cooling the autonomous driving controller 30.

Accordingly, the autonomous driving controller 30 may be efficiently cooled by the cooling system for the autonomous driving controller.

Hereinafter, the cooling apparatus 100 for the autonomous driving controller according to various exemplary embodiments of the present invention configured as above is described with reference to FIG. 2.

Figure 2:
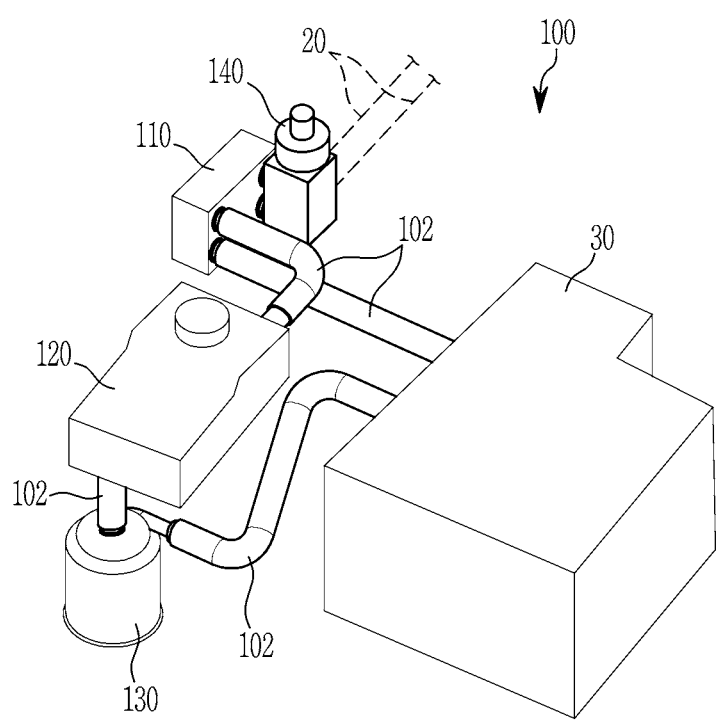
FIG. 2 is a perspective view of a cooling apparatus of an autonomous driving controller according to various exemplary embodiments of the present invention.

FIG. 2 is a perspective view of a cooling apparatus of an autonomous driving controller according to various exemplary embodiments of the present invention.

Referring to FIG. 2, the cooling apparatus 100 according to various exemplary embodiments of the present invention is provided in the above-described the cooling system for the autonomous driving controller, and includes the chiller 110, the reservoir tank 120, and the water pump 130.

Herein, the chiller 110, the reservoir tank 120, the water pump 130, and the autonomous driving controller 30 may be interconnected through the coolant pipe 102 so that the coolant stored in the reservoir tank 120 circulates.

The coolant pipe 102 connected to the water pump 130 and the chiller 110 may be connected to the autonomous driving controller 30 respectively.

Furthermore, the sub-expansion valve 140 may be connected to the refrigerant connection line 20 and may be integrally mounted on the chiller 110.

When cooling the autonomous driving controller 30, the sub-expansion valve 140 may expand the refrigerant inflowed through the refrigerant connection line 20 and supply the expanded refrigerant to the chiller 110.

That is, the coolant stored the reservoir tank 120 is passed through the chiller 110 by operation of the water pump 130, and the coolant passed through the chiller 110 may be supplied to the autonomous driving controller 30.

In the cooling device 100 configured as described above, the chiller 110, the reservoir tank 120, the water pump 130, and the sub-expansion valve 140 are the same as described in the above-described cooling system, a detailed description of a configuration and operation thereof will be omitted.

Figure 3:
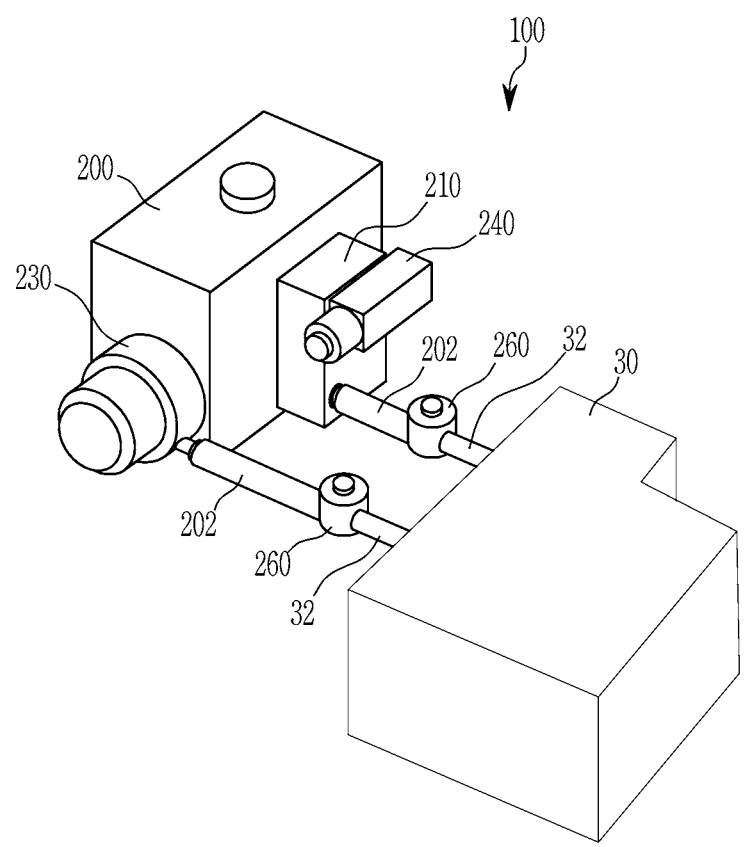
FIG. 3 is a schematic diagram of a cooling apparatus of an autonomous driving controller according to various exemplary embodiments of the present invention.
Figure 4:
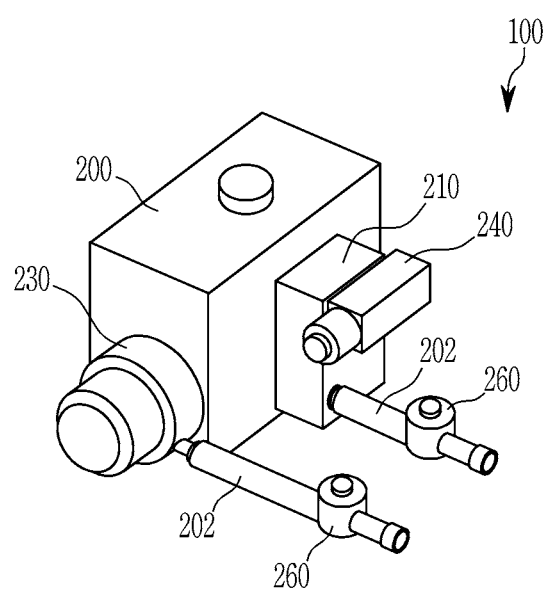
FIG. 4 is a perspective view of a cooling apparatus of an autonomous driving controller according to various exemplary embodiments of the present invention.

Meanwhile, a description will be provided with reference to FIG. 3 and FIG. 4 to which a cooling apparatus 200 for an autonomous driving controller according to various exemplary embodiments of the present invention is attached.

FIG. 3 is a schematic diagram of a cooling apparatus of an autonomous driving controller according to various exemplary embodiments of the present invention, and FIG. 4 is a perspective view of a cooling apparatus of an autonomous driving controller according to various exemplary embodiments of the present invention.

In FIG. 3 and FIG. 4, reference numerals of the foregoing exemplary embodiment are provided to constituent elements identical to or corresponding to those of the foregoing exemplary embodiment of the present invention.

Referring FIG. 3 and FIG. 4, a cooling apparatus 200 for and autonomous driving controller according to various exemplary embodiments of the present invention, includes a chiller 210, a reservoir tank 220, and a water pump 230.

First, the chiller 210 is connected to the air-conditioning system 10 through a refrigerant connection line 20 to inflowed a refrigerant circulating in the air-conditioning system 10 of the cooling system described above.

The chiller 210 heat-exchanges the inflowed refrigerant with the coolant supplied from the reservoir tank 220. That is, the chiller 210 may be a water-cooled heat exchanger.

The reservoir tank 220 stores the coolant and is connected to the chiller 210.

The water pump 230 is provided between the reservoir tank 220 and the autonomous driving controller 30.

Herein, when the coolant circulating through the cooling apparatus 200 is insufficient, the reservoir tank 220 may be flowed into the coolant stored therein to the coolant pipe 202.

Meanwhile, the chiller 210 and the water pump 230 may be directly mounted on the reservoir tank 220.

That is, the chiller 210, the reservoir tank 220, and the water pump 230 have a modular structure in which the chiller 210 and the water pump 230 are integrally connected through the reservoir tank 220 may be formed.

Meanwhile, the coolant pipe 202 connected to the water pump 230 and the chiller 210 may be connected to the autonomous driving controller 30 respectively.

A sub-expansion valve 240 may be provided between chiller 210 and the refrigerant connection line 20 to expand the refrigerant supplied to the chiller 210 through the refrigerant line 11.

The sub-expansion valve 240 may expand the refrigerant supplied through the refrigerant connection line 20 and supply the refrigerant to the chiller 210. The sub-expansion valve 240 may be configured mechanically or electronically.

In the cooling apparatus 200 configured as described above, the chiller 210 and the water pump 230 may be directly mounted on the reservoir tank 220 to form a modular structure, and the cooling apparatus 200 is connected to the autonomous driving controller 30 through the cooling water pipe 202 having a relatively short length.

Meanwhile, a stop connector 260 may be mounted on the coolant pipe 202 connected to the water pump 230 and the chiller 210 respectively.

A connection pipe 32 may be provided in the autonomous driving controller 30 to connect the stop connector 260.

The stop connector 260 is applied to easily attach and detach the cooling apparatus 200 modularized by the reservoir tank 220 to the connection pipe 32 of the autonomous driving controller 30.

That is, the cooling apparatus 200 modularized by the reservoir tank 220 may fill the reservoir tank 220 with coolant before being connected to the autonomous driving controller 30.

When the filling of the coolant in the reservoir tank 220 is completed, the cooling apparatus 200 is easily connected to the connection pipe 32 by the stop connector 260, so that the connection between the cooling device 200 and the autonomous driving controller 30 may be completed.

Furthermore, when maintenance of the cooling apparatus 200 is required, it may be easily separated from the autonomous driving controller 30 by the stop connector 260, improving mountability and maintainability.

In the cooling apparatus 200 according to various exemplary embodiments of the present invention configured as described above, the chiller 210 may cool the coolant circulated in the cooling apparatus 200 by the operation of the water pump 230 through heat exchange with the refrigerant, and selectively supply the coolant to the autonomous driving controller 30 to prevent the autonomous driving controller 30 from overheating.

That is, the chiller 210 heat-exchanges the refrigerant supplied in the expanded state from the sub-expansion valve 240 with the coolant supplied by the operation of the water pump 230.

A low-temperature coolant cooled through heat exchange with the refrigerant in the chiller 210 may be supplied to the autonomous driving controller 30 by the operation of the water pump 230 to cool the autonomous driving controller 30.

That is, the coolant stored in the reservoir tank 210 is cooled while passing through the chiller 210 through operation of the water pump 230. Accordingly, the cooled coolant may be supplied to the autonomous driving controller 30 to cool the autonomous driving controller 30.

Accordingly, the autonomous driving controller 30 may be efficiently cooled by the cooling apparatus 200.

Therefore, when the cooling apparatus 100, 200 and a cooling system provided with the same for an autonomous driving controller according to the exemplary embodiments of the present invention configured as described above is applied, it may heat-exchange the refrigerant and the coolant in cooperation with the air-conditioning system 10 in the vehicle configured for autonomous driving and efficiently cool the autonomous driving controller 30 by use of the coolant of the heat-exchanged low temperature, simplifying the entire system and the layout of the coolant pipe 102, 202.

Furthermore, by facilitating installation and detachment through modularization of the cooling apparatus 200, manufacturing cost may be reduced and weight may be reduced, and space utilization and maintenance may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cooling apparatus for an autonomous driving controller, the cooling apparatus comprising:
    a chiller fluidically connected to an air-conditioning system through a refrigerant connection line so that a refrigerant circulating in the air-conditioning system provided in the vehicle is introduced into the chiller;
    a reservoir tank storing a coolant, and fluidically connected to the chiller; and
    a pump mounted between the reservoir tank and the autonomous driving controller;

wherein at least a coolant pipe connected to the pump and the chiller is connected to the autonomous driving controller, and wherein a stop connector is mounted on the at least a coolant pipe connected to the pump and the chiller respectively.

2. The cooling apparatus for the autonomous driving controller of claim 1, wherein a sub-expansion valve is mounted on the chiller to expand the refrigerant supplied to the refrigerant connection line.

3. The cooling apparatus for the autonomous driving controller of claim 2, wherein the sub-expansion valve is connected to the refrigerant connection line, and is integrally mounted on the chiller.

4. The cooling apparatus for the autonomous driving controller of claim 2, wherein the sub-expansion valve expands the refrigerant and supplies the refrigerant to the chiller.

5. The cooling apparatus for the autonomous driving controller of claim 1, wherein the chiller, the reservoir tank, the pump, and the autonomous driving controller are interconnected through the at least a coolant pipe so that the coolant stored in the reservoir tank circulates therebetween.

6. The cooling apparatus for the autonomous driving controller of claim 1, wherein the coolant stored in the reservoir tank is passed through the chiller by operation of the pump, and the coolant passed through the chiller is supplied to the autonomous driving controller.

7. The cooling apparatus for the autonomous driving controller of claim 1, wherein the chiller and the pump are directly mounted on the reservoir tank.

8. The cooling apparatus for the autonomous driving controller of claim 1, wherein the at least a coolant pipe includes a connection pipe provided in the autonomous driving controller to connect the stop connector.

9. The cooling apparatus for the autonomous driving controller of claim 7, wherein a first stop connector is mounted on a first coolant pipe of the at least a coolant pipe, the first coolant pipe connected to the pump and the autonomous driving controller, and wherein a second stop connector is mounted on a second coolant pipe of the at least a coolant pipe, the second coolant pipe connected to the chiller and the autonomous driving controller.

10. The cooling apparatus for the autonomous driving controller of claim 7, wherein the chiller, the reservoir tank, and the pump have a modular structure in which the chiller and the pump are integrally connected through the reservoir tank.

11. A cooling system for an autonomous driving controller, the cooling system comprising:

an air-conditioning system including a compressor, a condenser, an expansion valve, and an evaporator connected to a refrigerant line to heat or cool an interior of a vehicle using thermal energy generated when a refrigerant in the refrigerant line is condensed and evaporated;

a chiller connected to the air-conditioning system through a refrigerant connection line so that the refrigerant circulates in the air-conditioning system;

a reservoir tank storing a coolant therein, and connected to the chiller;

a pump mounted between the reservoir tank and the chiller;

wherein the autonomous driving controller is provided between the pump and the chiller, and wherein the chiller selectively supplies the coolant to the autonomous driving controller while cooling the coolant supplied from the reservoir tank through heat exchange with the refrigerant to prevent the autonomous driving controller from overheating, wherein a stop connector is mounted on at least a coolant pipe connected to the pump and the chiller respectively, and wherein the chiller, the reservoir tank, the pump, and the autonomous driving controller are interconnected through the at least a coolant pipe in which the coolant stored in the reservoir tank circulates.

12. The cooling system for the autonomous driving controller of claim 11, wherein a sub-expansion valve is provided between chiller and the refrigerant connection line to expand the refrigerant supplied through the refrigerant line.

13. The cooling system for the autonomous driving controller of claim 12, wherein the sub-expansion valve expands the refrigerant and supplies the refrigerant to the chiller.

14. The cooling system for the autonomous driving controller of claim 11, wherein the chiller is a water-cooled heat exchanger.

* * * * *